United States Patent
Blinzer et al.

(10) Patent No.: US 8,797,332 B2
(45) Date of Patent: Aug. 5, 2014

(54) DEVICE DISCOVERY AND TOPOLOGY REPORTING IN A COMBINED CPU/GPU ARCHITECTURE SYSTEM

(75) Inventors: Paul Blinzer, Bellevue, WA (US);
Leendert Van Doorn, Austin, TX (US);
Gongxian Jeffrey Cheng, Toronto (CA);
Elene Terry, Los Altos, CA (US);
Thomas Woller, Austin, TX (US);
Arshad Rahman, Richmond Hill (CA)

(73) Assignees: ATI Technologies ULC, Markham, Ontario (CA); Advanced Micro Devices, Inc., Sunnyvale, CA (US)

( * ) Notice: Subject to any disclaimer, the term of this patent is extended or adjusted under 35 U.S.C. 154(b) by 159 days.

(21) Appl. No.: 13/325,824

(22) Filed: Dec. 14, 2011

(65) Prior Publication Data

US 2012/0162234 A1 Jun. 28, 2012

Related U.S. Application Data

(60) Provisional application No. 61/423,565, filed on Dec. 15, 2010.

(51) Int. Cl.
*G06F 15/00* (2006.01)
*G06T 1/00* (2006.01)
*G06F 15/16* (2006.01)
*G06T 1/60* (2006.01)

(52) U.S. Cl.
USPC ............................ 345/501; 345/530; 345/503

(58) Field of Classification Search
None
See application file for complete search history.

(56) References Cited

U.S. PATENT DOCUMENTS

| | | | | |
|---|---|---|---|---|
| 7,444,637 B2* | 10/2008 | Pronovost et al. | ............ | 718/104 |
| 7,516,274 B2* | 4/2009 | Moll et al. | .................... | 711/118 |
| 7,814,486 B2 | 10/2010 | Papakipos et al. | | |
| 2004/0107421 A1* | 6/2004 | VoBa et al. | .................... | 718/102 |
| 2007/0143640 A1* | 6/2007 | Simeral et al. | ................. | 713/320 |
| 2007/0268296 A1* | 11/2007 | Ledebohm et al. | ........... | 345/501 |
| 2010/0329564 A1* | 12/2010 | Hervas et al. | ................. | 382/190 |

OTHER PUBLICATIONS

International Search Report and Written Opinion for International Application No. PCT/US2011/065136, United States Patent and Trademark Office, United States, mailed on Apr. 17, 2012.

* cited by examiner

*Primary Examiner* — Joni Richer
*Assistant Examiner* — Yi Wang
(74) *Attorney, Agent, or Firm* — Sterne, Kessler, Goldstein & Fox P.L.L.C.

(57) ABSTRACT

Methods and apparatus are provided, as an aspect of a combined CPU/APD architecture system, for discovering and reporting properties of devices and system topology that are relevant to efficiently scheduling and distributing computational tasks to the various computational resources of a combined CPU/APD architecture system. The combined CPU/APD architecture unifies CPUs and APDs in a flexible computing environment. In some embodiments, the combined CPU/APD architecture capabilities are implemented in a single integrated circuit, elements of which can include one or more CPU cores and one or more APD cores. The combined CPU/APD architecture creates a foundation upon which existing and new programming frameworks, languages, and tools can be constructed.

23 Claims, 7 Drawing Sheets

DEVICE DISCOVERY AND TOPOLOGY REPORTING IN A COMBINED CPU/GPU ARCHITECTURE SYSTEM

CROSS-REFERENCE TO RELATED APPLICATIONS

This application claims the benefit of U.S. Provisional Application No. 61/423,565, filed on Dec. 15, 2010 and is incorporated by reference in its entirety.

BACKGROUND

1. Field of the Invention

The present invention is generally directed to computer systems. More particularly, the present invention is directed to computer system topology.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

Both the discrete and single chip arrangements can limit the types of commands that can be sent to the GPU for execution. By way of example, computational commands (e.g., physics or artificial intelligence commands) often should not be sent to the GPU for execution. This performance-based limitation exists because the CPU may relatively quickly require the results of the operations performed by these computational commands. However, because of the high overhead of dispatching work to the GPU in current systems and the fact that these commands may have to wait in line for other previously-issued commands to be executed first, the latency incurred by sending computational commands to the GPU is often unacceptable.

Given that a traditional GPU may not efficiently execute some computational commands, the commands must then be executed within the CPU. Having to execute the commands on the CPU increases the processing burden on the CPU and can hamper overall system performance.

Although GPUs provide excellent opportunities for computational offloading, traditional GPUs may not be suitable for system-software-driven process management that is desired for efficient operation in a multi-processor environment. These limitations can create several problems.

For example, since processes cannot be efficiently identified and/or preempted, a rogue process can occupy the GPU hardware for arbitrary amounts of time. In other cases, the ability to context switch off the hardware is severely constrained—occurring at very coarse granularity and only at a very limited set of points in a program's execution. This constraint exists because saving the necessary architectural and microarchitectural states for restoring and resuming a process is not supported. Lack of support for precise exceptions prevents a faulted job from being context switched out and restored at a later point, resulting in lower hardware usage as the faulted threads occupy hardware resources and sit idle during fault handling.

Combining CPU, GPU, an I/O memory management into a unified architecture such that computational tasks can be efficiently scheduled and distributed requires system and application software to have some knowledge of the features, properties, interconnections, and attributes of the unified CPU/GPU system architecture.

SUMMARY OF EMBODIMENTS

What is needed are improved methods and apparatus for discovering and reporting properties of devices and system topology that are relevant to efficiently scheduling and distributing computational tasks to the various computational resources of a system implementing a combined CPU/GPU architecture.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof.

Methods and apparatus are provided, as an aspect of a combined CPU/APD architecture system, for discovering and reporting properties of devices and system topology that are relevant to efficiently scheduling and distributing computational tasks to the various computational resources of a combined CPU/APD architecture system. The combined CPU/APD architecture unifies CPUs and APDs in a flexible computing environment. In some embodiments, the combined CPU/APD architecture capabilities are implemented in a single integrated circuit, elements of which can include one or more CPU cores and one or more APD cores. The combined CPU/APD architecture creates a foundation upon which existing and new programming frameworks, languages, and tools can be constructed.

BRIEF DESCRIPTION OF THE DRAWINGS/FIGURES

DETAILED DESCRIPTION

Figure 1A:
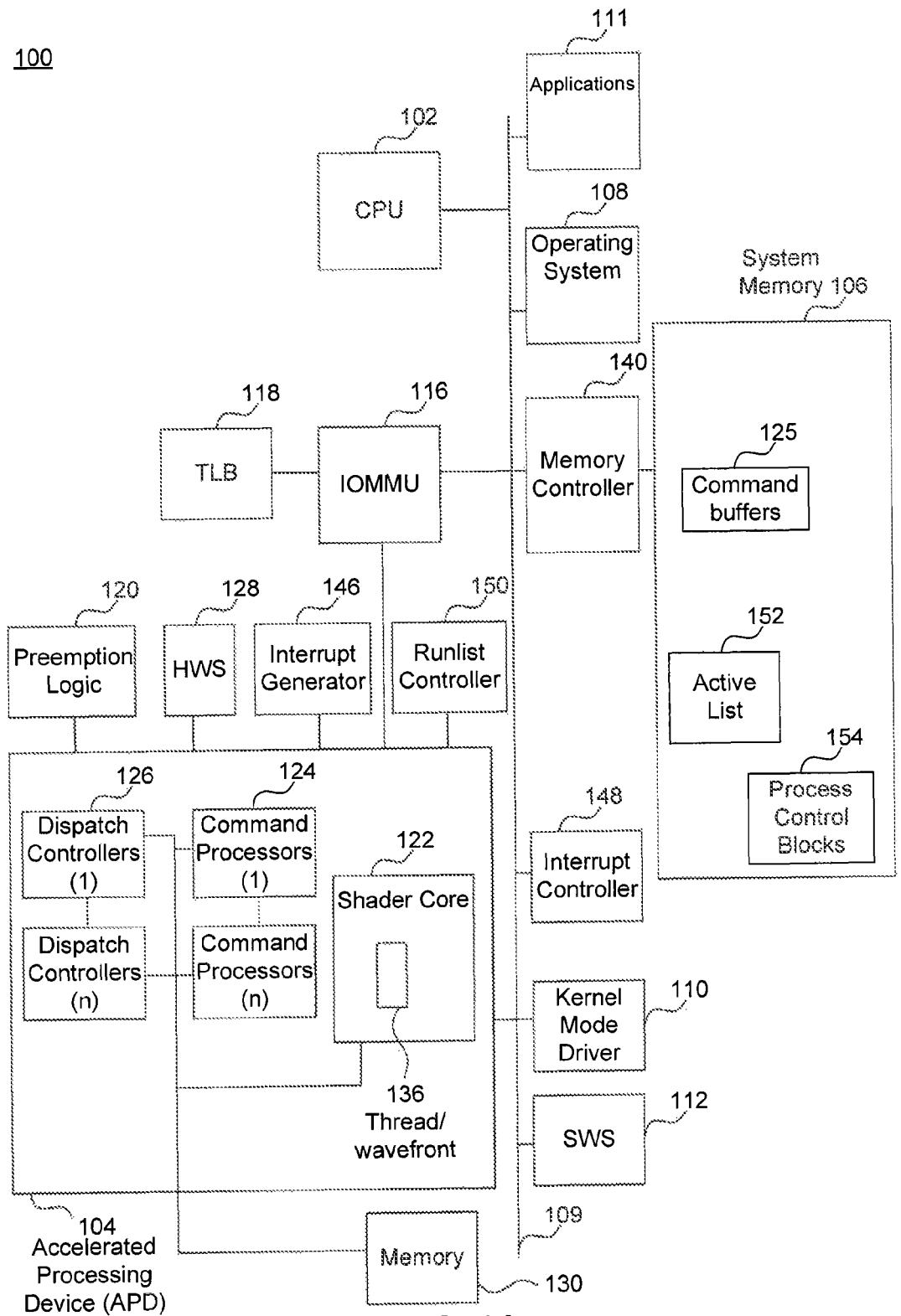
FIG. 1A is an illustrative block diagram of a processing system in accordance with present invention.

Generally, software should be aware of the properties of the underlying hardware to be better able to leverage the performance capabilities of the platform for feature utilization and task scheduling. In order to efficiently utilize the computational resources of a combined CPU/APD architecture system, the features, properties, interconnections, attributes and/or characteristics of the platform must be discovered and reported to the software.

Methods and apparatus are provided, as an aspect of a combined CPU/APD architecture system, for discovering and reporting properties of devices and system topology that are relevant to efficiently scheduling and distributing computational tasks to the various computational resources of a combined CPU/APD architecture system. The combined CPU/APD architecture in accordance with the invention unifies CPUs and APDs in a flexible computing environment.

In some embodiments, the combined CPU/APD architecture capabilities are implemented in a single integrated circuit, elements of which can include one or more CPU cores and one or more unified APD cores, as explained in greater detail below. In contrast to the traditional computing environment where the CPU and APD are typically separate (e.g., residing on separate cards or boards or in separate packages), the combined CPU/APD architecture creates a foundation upon which existing and new programming frameworks, languages, and tools can be constructed.

The unified environment of the combined CPU/APD system architecture enables programmers to write applications that seamlessly transition processing of data between CPUs and APDs, benefiting from the best attributes each has to offer. A unified single programming platform can provide a strong foundation for development in languages, frameworks, and applications that exploit parallelism.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Conventional mechanisms for CPU-based feature detection and scheduling, such as CPU identification (CPUID), run into severe limitations even for the homogeneous and comparatively simple CPU topologies that are commonly used in today's operating systems and platforms.

In order to properly configure the input/output memory management unit (IOMMU), it is necessary to discover the topology of the CPU/memory/APD/network (e.g., add-in boards, memory controller, north/south bridge, etc.). Similarly, in order to make scheduling and workload decisions appropriately, application software needs information such as how many different APDs and compute units are available and what properties the APDs and compute units possess. Therefore one or more processes, one or more hardware mechanisms, or a combination of both are needed for device discovery and topology reporting in accordance with the present invention. More generally, at least one mechanism, at least one process, or at least one mechanism and at least one process are needed for device discovery and topology reporting.

In one embodiment of the present invention, information regarding devices and topology is encoded prior to being reported to the application software. One way is to provide a table according to the advanced configuration and power interface (ACPI) specifications to the operating system level and then on to the user mode level. Information relevant to discovery of devices and topology and having utility for scheduling and workload decision making may be communicated by way of such a table. The table may include, but is not limited to, locality information (e.g., which memory is closest to the APD). By "closest", it is typically meant that that memory is physically closest since shorter signal paths usually mean lighter loading and shorter signal transit times. However "closest" as used herein more broadly includes the memory that is operable to transfer data most quickly.

With respect to CPU/scalar compute cores, the discoverable properties include, but are not limited to, number of cores, number of caches, and cache topology (e.g., cache affinity, hierarchy, latency), translation lookaside buffer (TLB), floating point unit (FPU), performance states, power states, and so on. Some properties, such as, for example, number of cores per socket and cache sizes, are currently exposed through the CPUID instruction. Additional properties, such as, for example, number of sockets, socket topology, performance/power states, etc., are or will be exposed through ACPI tables as defined through ACPI definitions which apply to conventional systems. The CPU cores may be distributed across different "locality domains" non-uniformity memory architecture (NUMA); however, to a first order, the cores are uniformly managed by the OS and virtual memory manager (VMM) schedulers.

With respect to APD compute cores, discoverable properties include, but are not limited to, single instruction multiple data (SIMD) size, SIMD arrangement, local data store affinity, work queue properties, CPU core, and IOMMU affinity, hardware context memory size and so on. Some discrete APD cores may be attachable or detachable from a live platform, while integrated APD cores may be hardwired or part of an accelerated processing unit in accordance with embodiments of the present invention.

With respect to support components, discoverable components include extended peripheral component interconnect (PCIe) switches, memory controller channels and banks on either the APU or discrete APD, and non-compute I/O devices (AHCI, USB, display controller, etc.). System and APD local memory may expose various coherent and non-coherent access ranges that the operating system manages differently, and which may have specific affinity to CPU or APD. Other data path properties, including but not limited to, type, width, speed, coherence property, and latency, may be discoverable. Some properties are exposed through PCI-E capability structures or ACPI tables; however, not all properties relevant to device discovery and topology reporting can currently be expressed with conventional mechanisms.

CPUID refers to an instruction which, when executed by a computational resource such as a CPU, provides information about its particular features and characteristics. For example, an x86 architecture CPU may provide information such as vendor ID, processor information and feature bits, cache and TLB descriptor information, processor serial number, highest extended function supported, extended processor information and feature bits, processor brand string, L1 cache and TLB identifiers, extended L2 cache features, advanced power management information, and virtual and physical address sizes.

FIG. 1A is an exemplary illustration of a unified computing system 100 including a CPU 102 and an APD 104. CPU 102 can include one or more single or multi core CPUs. In one embodiment of the present invention, the system 100 is formed on a single silicon die or package, combining CPU 102 and APD 104 to provide a unified programming and execution environment. This environment enables the APD 104 to be used as fluidly as the CPU 102 for some programming tasks. However, it is not an absolute requirement of this invention that the CPU 102 and APD 104 be formed on a single silicon die. In some embodiments, it is possible for them to be formed separately and mounted on the same or different substrates.

In one example, system 100 also includes a memory 106, an operating system 108, and a communication infrastructure 109. The operating system 108 and the communication infrastructure 109 are discussed in greater detail below.

The system 100 also includes a kernel mode driver (KMD) 110, a software scheduler (SWS) 112, and a memory management unit 116, such as an IOMMU. Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface.

Device drivers, particularly on modern Microsoft Windows® platforms, can run in kernel-mode (Ring 0) or in user-mode (Ring 3). The primary benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user module only through the use of system calls. End user programs like the UNIX shell or other GUI based applications are part of the user space. These applications interact with hardware through kernel supported functions.

CPU 102 can include (not shown) one or more of a control processor, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104.

APD 104, among other things, executes commands and programs for selected functions, such as graphics operations and other operations that may be, for example, particularly suited for parallel processing. In general, APD 104 can be frequently used for executing graphics pipeline operations, such as pixel operations, geometric computations, and rendering an image to a display. In various embodiments of the present invention, APD 104 can also execute compute processing operations (e.g., those operations unrelated to graphics such as, for example, video operations, physics simulations, computational fluid dynamics, etc.), based on commands or instructions received from CPU 102.

For example, commands can be considered as special instructions that are not typically defined in the instruction set architecture (ISA). A command may be executed by a special processor such a dispatch processor, command processor, or network controller. On the other hand, instructions can be considered, for example, a single operation of a processor within a computer architecture. In one example, when using two sets of ISAs, some instructions are used to execute x86 programs and some instructions are used to execute kernels on an APD compute unit.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102.

APD 104 can include its own compute units (not shown), such as, but not limited to, one or more SIMD processing cores. As referred to herein, a SIMD is a pipeline, or programming model, where a kernel is executed concurrently on multiple processing elements each with its own data and a shared program counter. All processing elements execute an identical set of instructions. The use of predication enables work-items to participate or not for each issued command.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks such as those that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD compute unit. This function is also referred to as a kernel, a shader, a shader program, or a program.

In one illustrative embodiment, each compute unit (e.g., SIMD processing core) can execute a respective instantiation of a particular work-item to process incoming data. A work-item is one of a collection of parallel executions of a kernel invoked on a device by a command. A work-item can be executed by one or more processing elements as part of a work-group executing on a compute unit.

A work-item is distinguished from other executions within the collection by its global ID and local ID. In one example, a subset of work-items in a workgroup that execute simultaneously together on a SIMD can be referred to as a wavefront 136. The width of a wavefront is a characteristic of the hardware of the compute unit (e.g., SIMD processing core). As referred to herein, a workgroup is a collection of related work-items that execute on a single compute unit. The work-items in the group execute the same kernel and share local memory and work-group barriers.

In the exemplary embodiment, all wavefronts from a workgroup are processed on the same SIMD processing core. Instructions across a wavefront are issued one at a time, and when all work-items follow the same control flow, each work-item executes the same program. Wavefronts can also be referred to as warps, vectors, or threads.

An execution mask and work-item predication are used to enable divergent control flow within a wavefront, where each individual work-item can actually take a unique code path through the kernel. Partially populated wavefronts can be processed when a full set of work-items is not available at wavefront start time. For example, shader core 122 can simultaneously execute a predetermined number of wavefronts 136, each wavefront 136 comprising a multiple work-items.

Within the system 100, APD 104 includes its own memory, such as graphics memory 130 (although memory 130 is not limited to graphics only use). Graphics memory 130 provides a local memory for use during computations in APD 104. Individual compute units (not shown) within shader core 122 can have their own local data store (not shown). In one embodiment, APD 104 includes access to local graphics memory 130, as well as access to the memory 106. In another embodiment, APD 104 can include access to dynamic random access memory (DRAM) or other such memories (not shown) attached directly to the APD 104 and separately from memory 106.

In the example shown, APD 104 also includes one or "n" number of command processors (CPs) 124. CP 124 controls the processing within APD 104. CP 124 also retrieves commands to be executed from command buffers 125 in memory 106 and coordinates the execution of those commands on APD 104.

In one example, CPU 102 inputs commands based on applications 111 into appropriate command buffers 125. As referred to herein, an application is the combination of the program parts that will execute on the compute units within the CPU and APD.

A plurality of command buffers 125 can be maintained with each process scheduled for execution on the APD 104.

CP 124 can be implemented in hardware, firmware, or software, or a combination thereof. In one embodiment, CP 124 is implemented as a reduced instruction set computer (RISC) engine with microcode for implementing logic including scheduling logic.

APD 104 also includes one or "n" number of dispatch controllers (DCs) 126. In the present application, the term dispatch refers to a command executed by a dispatch controller that uses the context state to initiate the start of the execution of a kernel for a set of work groups on a set of compute units. DC 126 includes logic to initiate workgroups in the shader core 122. In some embodiments, DC 126 can be implemented as part of CP 124.

System 100 also includes a hardware scheduler (HWS) 128 for selecting a process from a run list 150 for execution on APD 104. HWS 128 can select processes from run list 150 using round robin methodology, priority level, or based on other scheduling policies. The priority level, for example, can be dynamically determined. HWS 128 can also include functionality to manage the run list 150, for example, by adding new processes and by deleting existing processes from run-list 150. The run list management logic of HWS 128 is sometimes referred to as a run list controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt the operating system 108 when interrupt events, such as page faults, are encountered by APD 104. For example, APD 104 can rely on interrupt generation logic within IOMMU 116 to create the page fault interrupts noted above.

APD 104 can also include preemption and context switch logic 120 for preempting a process currently running within shader core 122. Context switch logic 120, for example, includes functionality to stop the process and save its current state (e.g., shader core 122 state, and CP 124 state).

As referred to herein, the term state can include an initial state, an intermediate state, and/or a final state. An initial state is a starting point for a machine to process an input data set according to a programming order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set.

Preemption and context switch logic 120 can also include logic to context switch another process into the APD 104. The functionality to context switch another process into running on the APD 104 may include instantiating the process, for example, through the CP 124 and DC 126 to run on APD 104, restoring any previously saved state for that process, and starting its execution.

Memory 106 can include non-persistent memory such as DRAM (not shown). Memory 106 can store, e.g., processing logic instructions, constant values, and variable values during execution of portions of applications or other processing logic. For example, in one embodiment, parts of control logic to perform one or more operations on CPU 102 can reside within memory 106 during execution of the respective portions of the operation by CPU 102.

During execution, respective applications, operating system functions, processing logic commands, and system software can reside in memory 106. Control logic commands fundamental to operating system 108 will generally reside in memory 106 during execution. Other software commands, including, for example, kernel mode driver 110 and software scheduler 112 can also reside in memory 106 during execution of system 100.

In this example, memory 106 includes command buffers 125 that are used by CPU 102 to send commands to APD 104. Memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to memory 106 can be managed by a memory controller 140, which is coupled to memory 106. For example, requests from CPU 102, or from other devices, for reading from or for writing to memory 106 are managed by the memory controller 140.

Referring back to other aspects of system 100, IOMMU 116 is a multi-context memory management unit.

As used herein, context can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects.

Referring back to the example shown in FIG. 1A, IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a TLB 118. TLB 118, as an example, can be implemented in a content addressable memory (CAM) to accelerate translation of logical (i.e., virtual) memory addresses to physical memory addresses for requests made by APD 104 for data in memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, advanced graphics port (AGP), or other such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. CPU 102 can seamlessly send selected commands for processing on the APD 104.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

Processing logic for applications, operating system, and system software can include commands specified in a programming language such as C and/or in a hardware description language such as Verilog, RTL, or netlists, to enable ultimately configuring a manufacturing process through the generation of maskworks/photomasks to generate a hardware device embodying aspects of the invention described herein.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
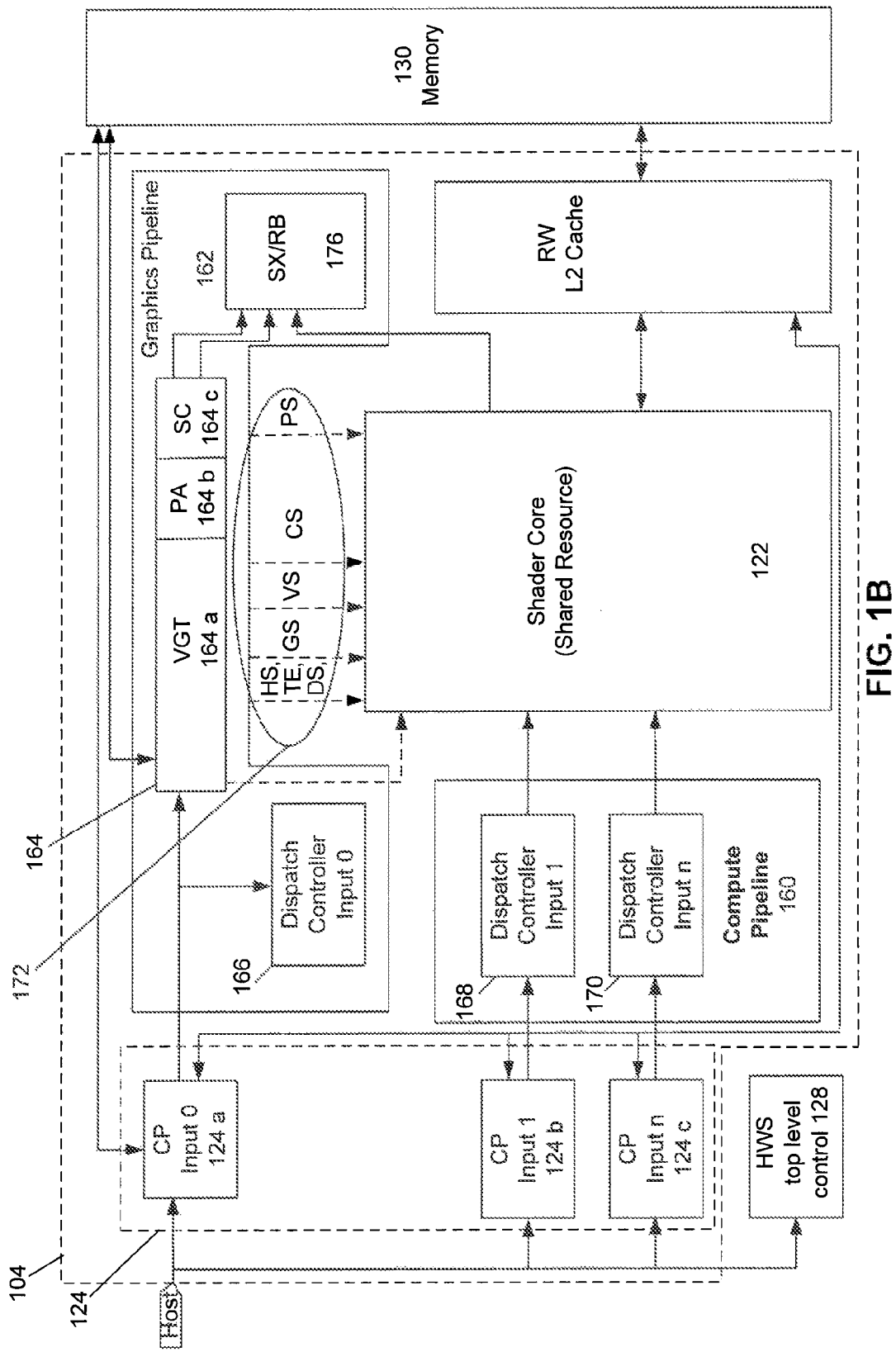
FIG. 1B is an illustrative block diagram of the APD illustrated in FIG. 1A.

FIG. 1B is an embodiment showing a more detailed illustration of APD 104 shown in FIG. 1A. In FIG. 1B, CP 124 can include CP pipelines 124*a*, 124*b*, and 124*c*. CP 124 can be configured to process the command lists that are provided as inputs from command buffers 125, shown in FIG. 1A. In the exemplary operation of FIG. 1B, CP input 0 (124*a*) is responsible for driving commands into a graphics pipeline 162. CP inputs 1 and 2 (124*b* and 124*c*) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164*a*, a primitive assembler (PA) 164*b*, a scan converter (SC) 164*c*, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124*a*. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124*b* and 124*c*.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched. After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

A disruption in the QoS occurs when all work-items are unable to access APD resources. Embodiments of the present invention facilitate efficiently and simultaneously launching two or more tasks to resources within APD 104, enabling all work-items to access various APD resources. In one embodiment, an APD input scheme enables all work-items to have access to the APD's resources in parallel by managing the APD's workload. When the APD's workload approaches maximum levels, (e.g., during attainment of maximum I/O rates), this APD input scheme assists in that otherwise unused processing resources can be simultaneously utilized in many scenarios. A serial input stream, for example, can be abstracted to appear as parallel simultaneous inputs to the APD.

By way of example, each of the CPs 124 can have one or more tasks to submit as inputs to other resources within APD 104, where each task can represent multiple wavefronts. After a first task is submitted as an input, this task may be allowed to ramp up, over a period of time, to utilize all the APD resources necessary for completion of the task. By itself, this first task may or may not reach a maximum APD utilization threshold. However, as other tasks are enqueued and are waiting to be processed within the APD 104, allocation of the APD resources can be managed to ensure that all of the tasks can simultaneously use the APD 104, each achieving a percentage of the APD's maximum utilization. This simultaneous use of the APD 104 by multiple tasks, and their combined utilization percentages, ensures that a predetermined maximum APD utilization threshold is achieved.

Figure 2:
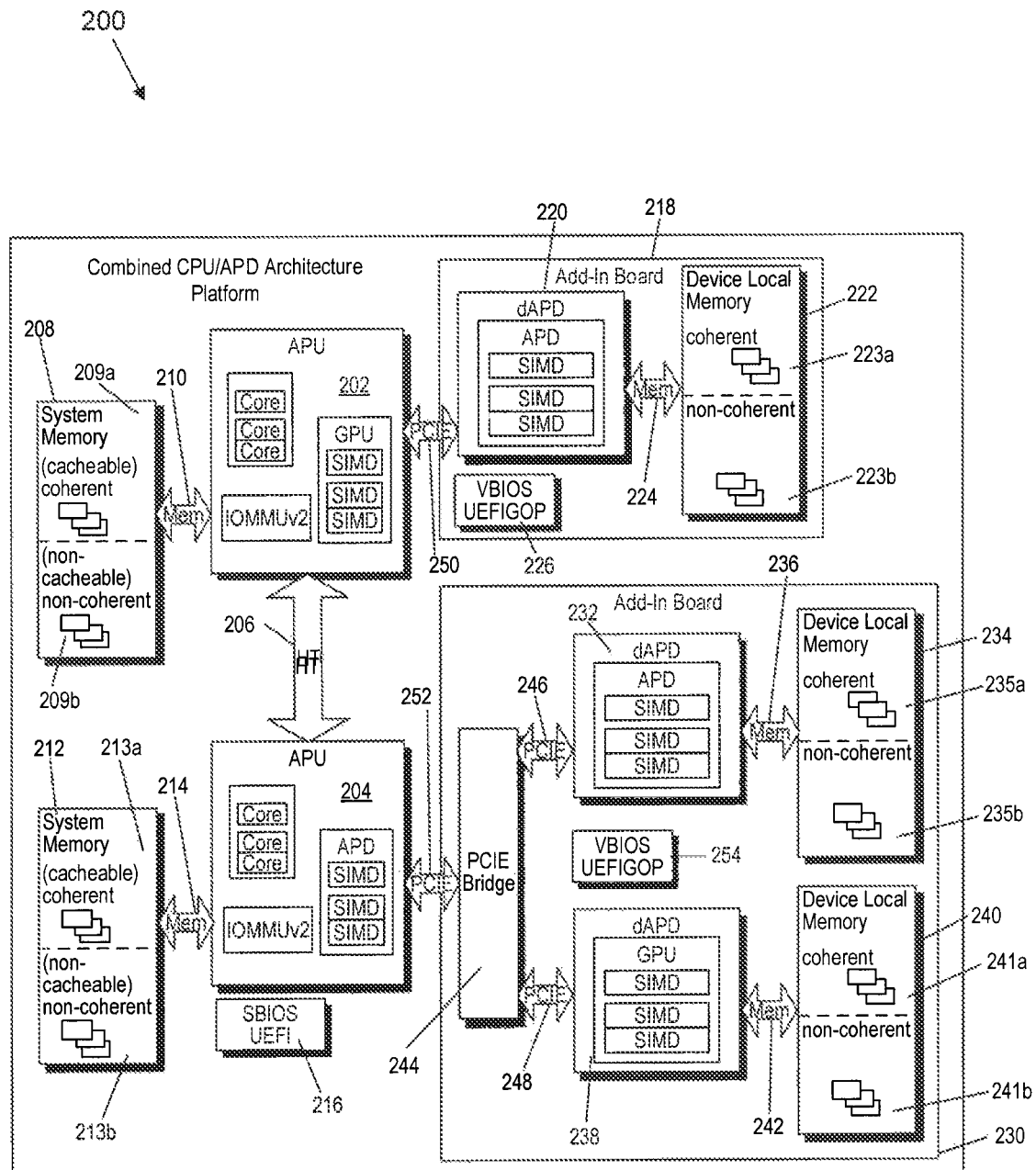
FIG. 2 is an illustrative block diagram of a combined CPU/APD architecture system.

The discovery of the properties of a combined CPU/APD architecture system is described below in connection with a representative system which is shown in FIG. 2. As will be described in greater detail below, the representative system includes two APUs coupled to each other with an interprocessor communication link, a first add-in board coupled to a first of the two APUs, the first add-in board having a dedicated APD and local memory; and a second add-in board coupled to a second of the two APUs, the second add-in board having two dedicated APDs with each of those APDs coupled to its own local memory; and both of the APDs coupled to the second APU through a shared PCIe bridge. This exemplary system is used to illustrate various features, properties, and capabilities that, when their presence, properties, interconnections and/or attributes are made known to software, such as but not limited to application software, can be used by that software to more efficiently utilize the computational resources of the platform. As will be appreciated by those of ordinary skill, alternative embodiments having differing configurations and arrangements are contemplated.

In accordance with the present invention, several extensions to the established platform infrastructure discovery mechanisms (such as, for example, extensions to ACPI) are provided that allow incorporating properties of a combined CPU/APD architecture system architecture into the discoverable platform properties in a flexible, extensible and consistent manner. Other communications protocols in addition to, or in replacement of, ACPI could also be employed by other embodiments. Various embodiments of the present invention introduce features and improvements to incorporate CPU, APU and APD properties into a consistent infrastructure, to support software. This software may also be referred to as operating system platform/power management software (OSPM).

FIG. 2 is a block diagram of an illustrative heterogeneous platform design within model disclosed herein and illustrates various components and/or subsystems, wherein discovery of their presence and/or attributes provides needed information to the system and/or to application software so that effective scheduling of tasks may be performed. In the description that follows, FIG. 2 will be used to help outline the properties associated with the various components. For that reason a platform with two APUs is provided as an illustrative example.

The present invention is not limited to the illustrative embodiment of FIG. 2, and it is noted that embodiments of the present invention include both larger and smaller platform designs with more than two or with one APU socket in a similar fashion. The embodiments described herein are for illustrative purposes, and it is to be understood that other embodiments in accordance with the present invention are possible. The detailed implementation properties of a specific platform design in accordance with the present invention may be different.

Referring to FIG. 2, the platform components break down into a number of blocks, each of which may contain different features, properties, interconnections, and/or attributes. Software, including but to a lesser degree application software enumerate these features, properties, interconnections, and/or attributes, and incorporate these into the code operation.

A system platform 200 in accordance with the present invention. System platform 200 includes a first APU 202 and a second APU 204. APU 202 and APU 204 are communicatively coupled by a first interprocessor communication link 206. In one embodiment, first interprocessor communication link 206 is a HyperTransport link. APUs 202, 204 each include a CPU with a plurality of cores, an APD with a plurality of SIMD cores, and an input/output memory manager unit.

Illustrative system platform 200 further includes a first system memory 208 coupled to first APU 202 by a first memory bus 210. First system memory 208 includes coherent cacheable portion 209a and a non-coherent non-cacheable portion 209b. System platform 202 further includes a first add-in board 218 and a second add-in board 230. First add-in board 218 is coupled to first APU 202 by a first PCIe bus 250. Second add-in board 230 is coupled to second APU by a second PCIe bus 252. In various alternative embodiments, some or all of the physical components and/or software, firmware, or microcode, of one or both of first add-in board 218 and second add-in board 230 are disposed on a common substrate (e.g., a printed circuit board) with one or more APUs.

First add-in board 218 includes a first dedicated APD 220, a first local memory 222 coupled to first dedicated APD 220 by a memory bus 224, and a first firmware memory 226 having stored therein firmware such as VBIOS UEFI GOP (video basic input output system, unified extensible firmware interface, graphics output protocol). First firmware memory 226 is typically physically implemented as a non-volatile memory, but such an implementation is not a requirement of the present invention. First dedicated APD 220 includes one or more SIMD units. First local memory 222 includes a first portion 223a that is coherent, and a second portion 223b that is non-coherent. First local memory 222 is typically physically embodied as a volatile memory, but such an implementation is not a requirement of the present invention.

Second add-in board 230 includes a second dedicated APD 232, a second local memory coupled to second APD 232 by a memory bus 236, a third dedicated APD 238, a third local memory 240 coupled to third dedicated APD 238 by a memory bus 242, a PCIe bridge 244 coupled to second dedicated APD 232 by a PCIe bus 246, PCIe bridge 244 further coupled to third dedicated APD 238 by a PCIe bus 248. Second local memory 234 includes a first portion 235a that is coherent, and a second portion 235b that is non-coherent. Third local memory 240 includes a first portion 241a that is coherent, and a second portion 241b that is non-coherent.

Second and third local memories 234, 240 are typically physically implemented as a volatile memory, but such an implementation is not a requirement of the present invention. Second add-in board 230 further includes a second firmware memory 254 having stored therein firmware such as VBIOS UEFI GOP.

Traditionally, CPU functionality and resources are exposed through the CPUID instruction and ACPI tables and methods (e.g., for capabilities and features, power and performance states, etc.), whereas for other devices in the system, for example, peripheral devices, PCIe capability structures are utilized.

Basic characteristics described through these mechanisms include resource functionality and resource affinity; the former is usually described as "pools" of uniform components with identical features and characteristics (e.g., CPU cores), the latter in general requiring hierarchical expressions describing the topology and relationship between those resources. Each of these representations has benefits for certain tasks, and therefore may be retained in the enumeration process in embodiments of the present invention.

Presented below, in connection with a combined CPU/APD computational system architecture, are various design principles and detailed component properties exposed for enumeration, along with methods and mechanisms for exposing those properties. Some properties may be exposed via either one or more executed instructions (e.g., CPUID), and some properties may be exposed via information structures such as tables. In various alternative embodiments, a particular property may be exposed by CPUID, information structure, or both.

Basic detection of a combined CPU/APD computational system architecture platform, may be accomplished by executing a CPUID instruction. It is noted however, that executing a CPUID instruction does not generally provide for detail capabilities discovery of the combined CPU/APD computational system components. Rather this mechanism typically provides only a yes/no answer regarding whether the system itself is a combined CPU/APD computational system. Therefore, in accordance with aspects of the present invention, combined CPU/APD computational system architecture detail features are generally provided via information structures, such as improved ACPI tables, that specify the relevant features in detail of the combined CPU/APD computational system architecture platform.

In one embodiment, the CPU is embodied so that it may execute an improved CPUID instruction, and which when executed exposes basic information regarding the combined CPU/APD architecture system. In this illustrative embodiment, CPUID Fn8000_001E EDX is used for basic information exposure of the combined CPU/APD architecture system (see Table 1 below). Application and other software can use Bit 0 to identify if it is running on a combined CPU/APD architecture capable platform. Running on a combined CPU/APD architecture capable platform means that the platform has at least one APU containing both combined CPU/APD architecture compliant CPU and APD functionality, i.e., compute units and SIMDs. Software may then use discovery and evaluation of the content of an improved ACPI table to retrieve the detailed information of the available functionality and topology. It is noted that the present invention is not limited to this particular op code for the CPUID instruction, or to the particular arrangement of bits or fields as shown in Table 1.

TABLE 1

| CPUID Fn8000_001E_EDX Bits | Description |
| --- | --- |
| 31:9 | Reserved |
| 8 | Reserved (may be used for combined architecture IOMMU present) |
| 7:1 | Reserved (may be used for combined architecture version ID) |
| 0 | Combined architecture major version/Family (0: Not present, 1: combined architecture capable APU present |

In accordance with embodiments of the present invention, the discovery process on a platform such as shown in FIG. 2 exposes information regarding the available components based on locality, loosely in hierarchical order. The discovery process is conceptually similar to the ACPI NUMA node definition (ACPI 4.0 Specification) but is improved to include the specific APD/SIMD properties and IOMMU functionality into the node properties.

Figure 3:
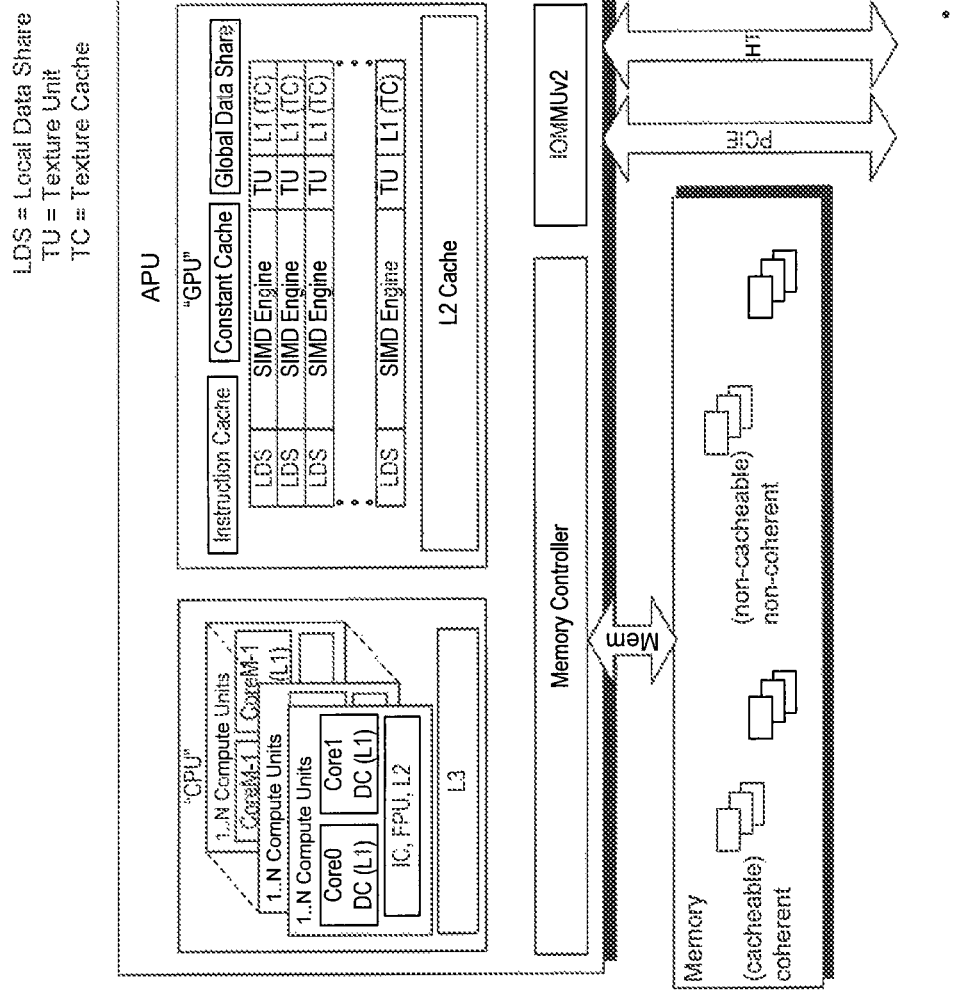
FIG. 3 is an illustrative block diagram of an APU, that is an integrated circuit having a CPU with multiple cores, an APD with multiple single instruction multiple data (SIMD) engines and further having memory management and I/O memory management circuitry.
Figure 4:
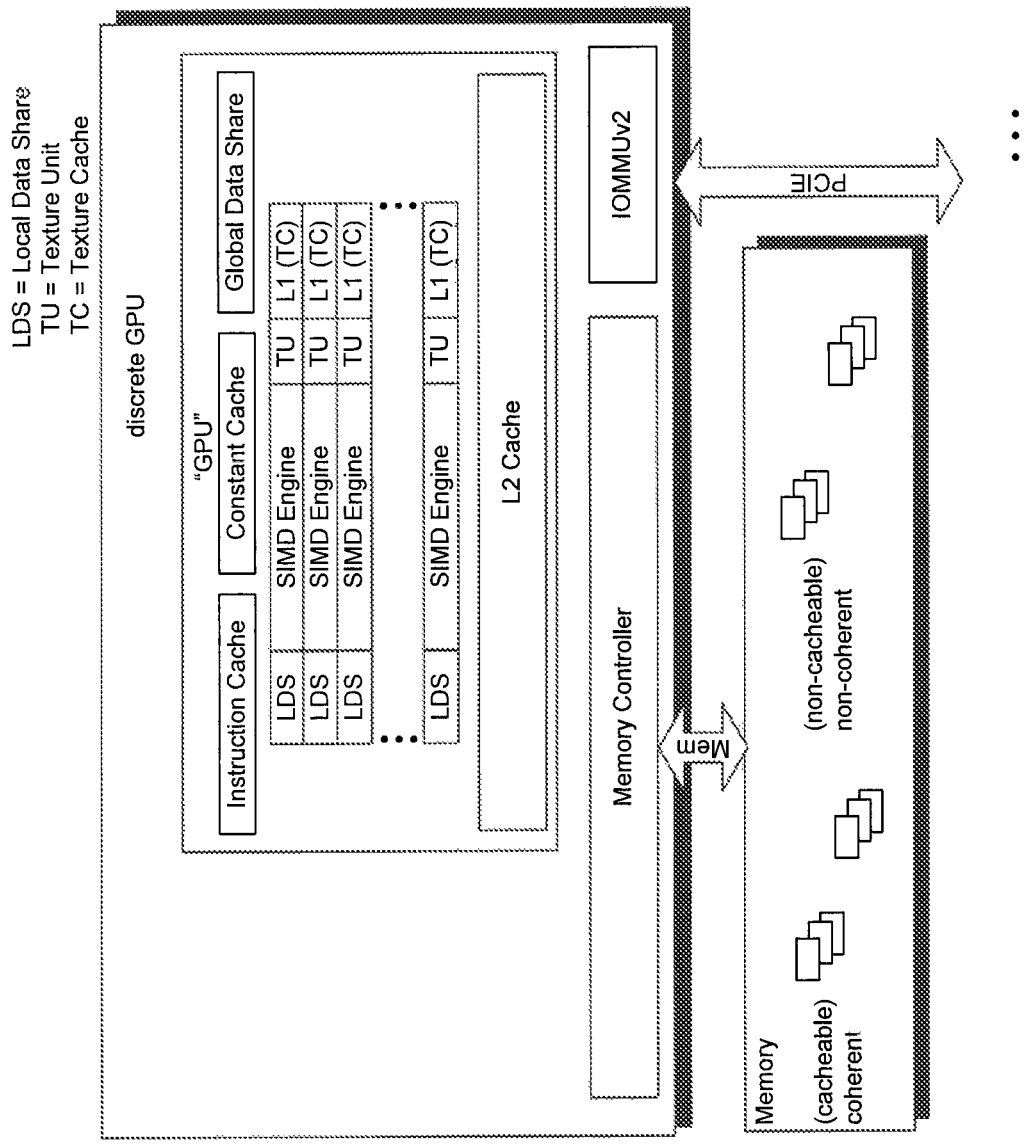
FIG. 4 is an illustrative block diagram of a dedicated APD.

A combined CPU/APD architecture system platform is characterized as containing one or more processing units compliant with the CPU/APD architecture (see FIGS. 3 and 4), wherein at least one is an APU (i.e., containing both CPU Compute and APD-SIMD execution units). Each of the processing units is roughly defined through its physical representation (e.g., "APU Socket", APD "adapter"/device) and has discoverable internal sub-components and properties, such as but not limited to, CPU compute units and caches (optionally, none may be expressed in a combined architecture compliant discrete APD device); APD SIMD and caches (optional, if traditional CPU properties are expressed); memory controller(s) and connections; IOMMU (optionally, none may be expressed for a combined architecture compliant discrete APD); and IO connection interfaces (e.g., PCIe, HyperTransport,DMI, internal, or other).

Since not all memory resources (e.g., APD local memory) are necessarily part of the coherent global memory, precautions are taken, to express these properties accordingly. Therefore rather than using a system resource affinity table (SRAT), improved information structures are provided to accommodate the information associated with the combined CPU/APD system architecture. More particularly, a new base structure in accordance with the present invention, herein referred to as the component resource affinity table (CRAT), and a number of related sub-structures are introduced. It is noted that this is an illustrative embodiment and that other information structure arrangements are within the scope of the present invention.

CRAT is the head structure of the discoverable combined CPU/APD architecture platform properties in the exemplary embodiment. Software parses the table to find the discoverable processing units, properties and their affinity, allowing software to identify component locality. CRAT content may change during runtime as some physical components arrive or depart from the system (e.g., hot plug of CPU/APU and/or discrete APD). Table 2 identifies and describes the fields of the CRAT.

TABLE 2

CRAT Header Structure

| Field Header | Byte Length | Byte Offset | Description |
| --- | --- | --- | --- |
| Signature | 4 | 0 | 'CRAT'. Signature for the Component Resource Affinity Table. |
| Length | 4 | 4 | Length, in bytes, of the entire CRAT. The length implies the number of Entry fields at the end of the table |
| Revision | 1 | 8 | 0 |
| Checksum | 1 | 9 | Entire table must sum to zero |
| OEMID | 6 | 10 | OEM ID |
| OEM Table ID | 8 | 16 | For the Component Resource Affinity Table, the table ID is the manufacturer model ID |
| OEM Revision | 4 | 24 | OEM revision of Component Resource Affinity Table for supplied OEM Table ID |
| Creator ID | 4 | 28 | Vendor ID of utility that created the table. |
| Creator Revision | 4 | 32 | Revision of utility that created the table |
| TotalEntries | 4 | 36 | Total number [n] of entries in the Component Resource Allocation Structure |
| NumDomains | 2 | 40 | Number of combined architecture proximity domains. This includes possible discrete APD "domains" that are represented for possible Add-In-Boards attached, e.g., via PCI Express. Not all of them may be populated initially at platform definition. This number may be higher than the CPU proximity domains expressed in SRAT due to additional entries for other (PCIe connected) combined architecture components. |
| Reserved | 6 | 42 | Reserved |
| Component Resource Allocation Structure[n] | — | 48 | A list of component resource allocation structures for the platform. See definitions below for the various sub-components. |

The CRAT header includes and precedes the sub-component structures containing the actual component information. The sub-components are described by the sub-component tables as follows.

Various embodiments of the present invention provide an APU affinity information structure. This sub-component describes the APU node components, available I/O interfaces and their bandwidth and provides this information to software. Multiple such structures may be expressed for the same node in order to adequately describe more complex APU platform properties. Table 3 identifies and describes the fields of the CRAT APU Affinity Information Structure. It is noted that this is an illustrative embodiment and that other information structure arrangements are within the scope of the present invention.

Table 5 shows the memory component affinity structure which indicates presence of memory nodes in the structures' topology. The same structure is used to both describe system memory and visible device local memory resources. It is noted that this is an illustrative embodiment and that other information structure arrangements are within the scope of the present invention.

TABLE 3

CRAT APU Affinity Information Structure

| Field | Byte Length | Byte Offset | Description |
|---|---|---|---|
| Type | 1 | 0 | 0 APU Structure |
| Length | 1 | 1 | 40 (Length, in bytes, of the APU Structure) |
| Reserved | 2 | 2 | Reserved |
| Flags | 4 | 4 | Flags—APU Affinity Structure. Indicates whether the node is active and can be hot plugged and what functionality is present. For details see Table 4 |
| Proximity Domain | 4 | 8 | Integer that represents the proximity domain to which the node belongs |
| ProcessorIdLow | 4 | 12 | Low value of the logical processor included in this combined architecture proximity domain. For CPUs this value is the low value of APIC Id of that APU. Logical SIMD Id are expressed with bit 31 set to 1 (0x80000000). |
| CPUCoreCount | 2 | 16 | Indicates overall count of x86(−64) -compatible execution units (CPU cores) present in this (APU-) node (identifiable by SW). This value is 0 for a node with a discrete APD. |
| SIMDCount | 2 | 18 | Indicates overall count of APD SIMDs present in this node (identifiable by SW). This value is 0 if no SIMDs are present in this node (="traditional" CPU). |
| SIMDWidth | 2 | 20 | "Width" of a single SIMD unit. SIMDCount*SIMDWidth determines the total number of non-x86 execution units. If SIMDCount is 0, this value is ignored. |
| IOCount | 2 | 22 | Number of discoverable IO Interfaces connecting this node to other components. These can be e.g., HyperTransport, PCIe or component-internal Interfaces. The value is 0 if platform does not characterize IO properties. If value is non-0, IO Interface parameters (e.g., maximum bandwidth, latency) can be characterized by CRAT component sub-structures. |
| Reserved | 16 | 24 | Reserved |

Table 4 describes the Flags field of the APU affinity information structure and provides further information about the parameters. It is noted that this is an illustrative embodiment and that other information structure arrangements are within the scope of the present invention.

TABLE 4

Flags field of the CRAT APU Affinity Structure

| Field | Bit Length | Bit Offset | Description |
|---|---|---|---|
| Enabled | 1 | 0 | If clear, OSPM ignores the contents of the APU Affinity Structure. This allows system firmware to populate the CRAT with a static number of structures but only enable them as necessary. |
| Hot Pluggable | 1 | 1 | The information conveyed by this bit depends on the value of the Enabled bit.<br>If the Enabled bit is set and the Hot Pluggable bit is also set, the system hardware supports hot-add and hot-remove on the I/O interfaces<br>If the Enabled bit is set and the Hot Pluggable bit is clear, the system hardware does not support hot-add or hot-remove on their/O interfaces |
| CPU present | 1 | 2 | 1 if the APU processing unit node has x86 compatible execution units (=CPU) |
| APD present | 1 | 3 | 1 if the APU processing unit node has non-x86 SIMD execution units (=APD) |
| IOMMU present | 1 | 4 | 1 if the APU processing unit node has associated IOMMUvX(X >= 2) functionality present |
| Reserved | 27 | 5 | Must be zero |

TABLE 5

CRAT Memory Component Affinity Structure

| Field | Byte Length | Byte Offset | Description |
|---|---|---|---|
| Type | 1 | 0 | 1 CRAT Memory Affinity Structure |
| Length | 1 | 1 | 40 (Length, in bytes, of the Memory Affinity Structure) |
| Reserved | 2 | 2 | Reserved |
| Flags | 4 | 4 | Flags—Memory Affinity Structure. Indicates whether the region of memory is enabled and can be hot plugged. For details see Table 6 |
| Proximity Domain | 4 | 8 | Integer that represents the proximity domain to which the memory belongs |
| Base Address Low | 4 | 12 | Low 32 Bits of the Base Address of the memory range |
| Base Address High | 4 | 16 | High 32 Bits of the Base Address of the memory range |
| Length Low | 4 | 20 | Low 32 Bits of the length of the memory range |
| Length High | 4 | 24 | High 32 Bits of the length of the memory range |
| Width | 4 | 28 | Memory width—Specifies the number of parallel bits of the memory interface (Alternative use: bandwidth of the memory) |
| Reserved | 8 | 32 | Reserved |

Table 6 shows the flags field of the memory affinity structure which provides further information about this node's parameters. It is noted that this is an illustrative embodiment and that other information structure arrangements are within the scope of the present invention.

TABLE 6

Flags field of the CRAT Memory Affinity component structure

| Field | Bit Length | Bit Offset | Description |
|---|---|---|---|
| Enabled | 1 | 0 | If clear, OSPM ignores the contents of the Memory Affinity Structure. This allows system firmware to populate the CRAT with a static number of structures but only enable them as necessary. |
| Hot Pluggable | 1 | 1 | The information conveyed by this bit depends on the value of the Enabled bit.<br>If the Enabled bit is set and the Hot Pluggable bit is also set, the system hardware supports hot-add and hot-remove of this memory region (Alternative: also used for discrete APD memory)<br>If the Enabled bit is set and the Hot Pluggable bit is clear, the system hardware does not support hot-add or hot-remove of this memory region. |
| Nonvolatile | 1 | 2 | If set, the memory region represents Non-Volatile memory |
| Reserved | 29 | 3 | Must be zero |

Table 7 shows the cache affinity information structure which provides the following topology information to the operating system: the association between a cache, its relative level (i.e., L1, L2 or L3) and the combined architecture proximity domain to which it belongs; and information about whether the cache is enabled, size, and lines. The cache affinity structure is used to express both "traditional" CPU cache topology and APD cache properties to software in a systematic way. It is noted that this is an illustrative embodiment and that other information structure arrangements are within the scope of the present invention.

TABLE 7

CRAT Cache Affinity information Structure

| Field | Byte Length | Byte Offset | Description |
|---|---|---|---|
| Type | 1 | 0 | 2 CRAT Cache Affinity Structure |
| Length | 1 | 1 | 64 (Length, in bytes, of the CRAT Cache Affinity Structure) |
| Reserved | 2 | 2 | Reserved |
| Flags | 4 | 4 | Flags—Cache Affinity Structure. Indicates whether the region of cache is enabled. For details see Table 8. |

TABLE 7-continued

CRAT Cache Affinity information Structure

| Field | Byte Length | Byte Offset | Description |
|---|---|---|---|
| ProcessorIdLow | 4 | 8 | Low value of a logical processor which includes this component. This value is the base of the sibling mask window representing logical processors which share this component.<br>For CPUs this value is the low value of APIC Id. Logical SIMD Id are expressed with bit 31 set to 1 (0x80000000). |
| SiblingMap | 32 | 12 | Bitmask of Processor Id sharing this component. 1 bit per logical processor. 32 bytes = 256 bits to describe 256 logical processors/SIMD per cache. |
| CacheSize | 4 | 44 | Cache size in KB |
| CacheLevel | 1 | 48 | Integer representing level: 1, 2, 3, 4, etc. |
| LinesPerTag | 1 | 49 | Cache Lines per tag |
| CacheLineSize | 2 | 50 | Cache line size in bytes |
| Associativity | 1 | 52 | Cache associativity<br>The associativity fields are encoded as follows:<br>00h: Reserved<br>01h: Direct mapped<br>02h-FEh: Associativity, (e.g., 04h = 4-way associative.)<br>FFh: Fully associative |
| CacheProperties | 1 | 53 | Cache Properties bits [2:0] represent Inclusive/Exclusive property encoded.<br>0: Cache is strictly exclusive to lower level caches<br>1: Cache is mostly exclusive to lower level caches<br>2: Cache is strictly inclusive to lower level caches<br>3: Cache is mostly inclusive to lower level caches<br>4: Cache is a "constant cache" (=explicit update)<br>5: Cache is a "specialty cache" (e.g., Texture cache)<br>6-7: Reserved<br>CacheProperties bits [7:3] are reserved |
| CacheLatency | 2 | 54 | Cost of time to access cache described in nanoseconds. Sub 1 ns time to be rounded to 1 ns. |
| Reserved | 8 | 56 | Reserved |

With respect to the 'CacheLatency' field of Table 7, it is noted various alternative embodiments may use more or less temporal granularity, and/or different rounding policies. It is further noted that alternative embodiments may include information regarding cache replacement policy, even in view of current microarchitectural differences that exist across vendor products.

Table 8 identifies and describes the information stored in the flags field of the CRAT cache affinity information structure. It is noted that this is an illustrative embodiment and that other information structure arrangements are within the scope of the present invention.

TABLE 8

Flags field of the CRAT Cache Affinity Information Structure

| Field | Bit Length | Bit Offset | Description |
|---|---|---|---|
| Enabled | 1 | 0 | If clear, the OSPM ignores the contents of the Cache Affinity Structure. This allows system firmware to populate the CRAT with a static number of structures but only enable then as necessary. This bit required to be enabled for the rest of the flags to be valid. |
| Data Cache | 1 | 1 | 1 if cache includes data |
| Instruction cache | 1 | 2 | 1 if cache includes instructions |
| CPU Cache | 1 | 3 | 1 if cache is part of CPU functionality |
| SIMD Cache | 1 | 4 | 1 if cache is part of SIMD functionality |
| Reserved | 27 | 5 | Must be zero |

Modern processors may include a TLB. A TLB is a cache of page translations for the physical processor. The TLB affinity structure, shown in Table 9, provides the following topology information statically to the operating system for a processor: the association between a TLB component, its relative level (i.e., L1, L2 or L3) and the sibling processors which share the component; information about whether the TLB affinity structure is enabled and if it contains translation for data or instructions. The TLB affinity structure is an extension to the list of static resource allocation structures for the platform. Changes to page level support in future architectures will require extensions to this table. It is noted that this structure may be an array of substructures, each describing a different page size. It is noted that this is an illustrative embodiment and that other information structure arrangements are within the scope of the present invention.

TABLE 9

CRAT Translation Look-aside Buffer Affinity Structure

| Field | Byte Length | Byte Offset | Description |
|---|---|---|---|
| Type | 1 | 0 | 3 CRAT TLB Affinity Structure |
| Length | 1 | 1 | 64 (Length, in bytes, of the CRAT TLB Affinity Structure) |
| Reserved | 2 | 2 | Reserved |
| Flags | 4 | 4 | Flags—TLB Affinity Structure. Indicates whether the TLB is enabled and defined. Details in See Table 10. |
| ProcessorIdLow | 4 | 8 | Low value of a logical processor which includes this component. This value is the base of the sibling mask window representing logical processors which share this component. For CPUs this value is the low value of APIC Id. Logical SIMD Id are expressed with bit 31 set to 1 (0x80000000). |
| SiblingMap | 32 | 12 | Bitmask of Processor Id sharing this component. 1 bit per logical processor. 32 bytes = 256 bits to describe 256 logical processors/SIMD per TLB. |
| TLBLevel | 4 | 44 | Integer representing level: 1, 2, 3, 4, etc. |
| DataTLBAssociativity2MB | 1 | 48 | Data TLB associativity for 2 MB pages<br>The associativity fields are encoded as follows:<br>00h: Reserved.<br>01h: Direct mapped.<br>02h-FEh: Associativity, (e.g., 04h = 4-way associative.)<br>FFh: Fully associative |
| DataTLBSize2MB | 1 | 49 | Data TLB number of entries for 2 MB |
| InstructionTLBAssoc2MB | 1 | 50 | Instruction TLB associativity for 2 MB pages<br>The associativity fields are encoded as follows:<br>00h: Reserved.<br>01h: Direct mapped.<br>02h-FEh: Associativity, (e.g., 04h = 4-way associative.)<br>FFh: Fully associative |
| InstructionTLBSize2MB | 1 | 51 | Instruction TLB number of entries for 2 MB pages |
| DTLB4KAssoc | 1 | 52 | Data TLB Associativity for 4 KB pages |
| DTLB4KSize | 1 | 53 | Data TLB number of entries for 4 KB pages |
| ITLB4KAssoc | 1 | 54 | Instruction TLB Associativity for 4 KB pages |
| ITLB4KSize | 1 | 55 | Instruction TLB number of entries for 4 KB pages |
| DTLB1GAssoc | 1 | 56 | Data TLB Associativity for 1 GB pages |
| DTLB1GSize | 1 | 57 | Data TLB number of entries for 1 GB pages |
| ITLB1GAssoc | 1 | 58 | Instruction TLB Associativity for 1 GB pages |
| ITLB1GSize | 1 | 59 | Instruction TLB number of entries for 1 GB pages |
| Reserved | 4 | 60 | Reserved |

TABLE 10

Flags field of the CRAT TLB Affinity Structure

| Field | Bit Length | Bit Offset | Description |
|---|---|---|---|
| Enabled | 1 | 0 | If clear, the OSPM ignores the contents of the TLB Affinity Structure. This allows system firmware to populate the CRAT with a static number of structures but only enable then as necessary. |
| Data TLB | 1 | 1 | 1 if TLB includes translation information for data |
| Instruction TLB | 1 | 2 | 1 if TLB includes translation information for instructions |
| CPU TLB | 1 | 3 | 1 if TLB is part of CPU functionality |
| SIMD TLB | 1 | 4 | 1 if TLB is part of SIMD functionality |
| Reserved | 27 | 5 | Must be zero |

Various embodiments of the present invention include an FPU Affinity Information Structure which provides the following topology information to the operating system: the association between an FPU and logical processors (CPU's) which share it; and Size. The FPU affinity structure is an extension to the list of static resource allocation structures for the platform. This information may be useful to applications which use AVX instructions to correlate which processors are siblings. Details of the CRAT FPU affinity information structure are shown in Table 11. It is noted that this is an illustrative embodiment and that other information structure arrangements are within the scope of the present invention.

TABLE 11

CRAT FPU Affinity information Structure

| Field | Byte Length | Byte Offset | Description |
|---|---|---|---|
| Type | 1 | 0 | 4 CRAT FPU Affinity Structure |
| Length | 1 | 1 | 64 (Length, in bytes, of the CRAT FPU Affinity Structure) |
| Reserved | 2 | 2 | Reserved |
| Flags | 4 | 4 | Flags—FPU Affinity Structure. Indicates whether the region of FPU affinity structure is enabled and defined. For details see Table 12. |
| ProcessorIdLow | 4 | 8 | Low value of a logical processor which includes this component. This value is the base of the sibling mask window representing logical processors which share this component. For CPUs this value is the low value of APIC Id. Logical SIMD Id are expressed with bit 31 set to 1 (0x80000000). |
| SiblingMap | 32 | 12 | Bitmask of Processor Id sharing this component. 1 bit per logical processor. 32 bytes = 256 bits to describe 256 logical processors/SIMD per TLB. |
| FPUSize | 4 | 44 | Product specific |
| Reserved | 16 | 48 | Reserved |

TABLE 12

Flags field of the CRAT FPU Affinity Structure

| Field | Bit Length | Bit Offset | Description |
|---|---|---|---|
| Enabled | 1 | 0 | If clear, the OSPM ignores the contents of the FPU Affinity Structure. This allows system firmware to populate the CRAT with a static number of structures but only enable then as necessary. |
| Reserved | 31 | 1 | Must be zero |

Various embodiments of the present invention include an IO affinity information structure (see Tables 13 and 14). The CRAT IO Affinity Information Structure provides the following topology information to the operating system: the association between a discoverable IO interface and combined CPU/APD architecture nodes which share it; maximum, minimum bandwidth and latency characterizations; and Size. The IO affinity structure is an extension to the list resource allocation structures for the platform. This information may be useful to applications which use AVX instructions to correlate which processors are siblings. It is noted that this is an illustrative embodiment and that other information structure arrangements are within the scope of the present invention.

TABLE 13

CRAT IO Affinity Information Structure

| Field | Byte Length | Byte Offset | Description |
|---|---|---|---|
| Type | 1 | 0 | 5 CRAT IO Affinity Structure |
| Length | 1 | 1 | 64 (Length, in bytes, of the CRAT IO Affinity Structure) |
| Reserved | 2 | 2 | Reserved |
| Flags | 4 | 4 | Flags—IO Affinity Structure. Indicates whether the region of IO affinity structure is enabled and defined. For details see Table 14. |
| Proximity Domain From | 4 | 8 | Integer that represents the proximity domain to which the IO Interface belongs |
| Proximity Domain To | 4 | 12 | Integer that represents the other proximity domain to which the IO Interface belongs |
| Type | 1 | 16 | IO Interface type. Values defined are<br>0: Undefined<br>1: Hypertransport<br>2: PCI Express<br>3: Other (e.g. internal)<br>4-255: Reserved |
| VersionMajor | 1 | 17 | Major version of the Bus interface (optional) |
| VersionMinor | 2 | 18 | Minor version of the Bus interface ((optional) |
| MinimumLatency | 4 | 20 | Cost of time to transfer, described in nanoseconds. Sub 1 ns time to be rounded to 1 ns. |
| MaximumLatency | 4 | 24 | Cost of time to transfer, described in nanoseconds. Sub 1 ns time to be rounded to 1 ns. |
| Minimum Bandwidth | 4 | 28 | Minimum interface Bandwidth in MB/s |
| Maximum Bandwidth | 4 | 32 | Maximum interface Bandwidth in MB/s |
| Recommended TransferSize | 4 | 36 | Recommended transfer size to reach maximum interface bandwidth in Bytes |
| Reserved | 24 | 40 | Reserved |

TABLE 14

Flags field of the CRAT IO Affinity Structure

| Field | Bit Length | Bit Offset | Description |
|---|---|---|---|
| Enabled | 1 | 0 | If clear, the OSPM ignores the contents of the FPU Affinity Structure. This allows system firmware to populate the CRAT with a static number of structures but only enable then as necessary. |
| Coherency | 1 | 1 | If set, IO interface supports coherent transactions (natively or through protocol extensions) |
| Reserved | 31 | 2 | Must be zero |

The i,j row and column values correlate to the fusion proximity domains defined in the CRAT table. In this illustrative embodiment, the entry values are one-byte unsigned integers. The relative distance from component locality i to component locality j is the (i*N+J)th entry in the matrix (index value is 2-byte unsigned integer), where N is the number of combined CPU/APD architecture proximity domains. Except for the relative distance from a component locality to itself, each relative distance is stored twice in the matrix. This provides the capability to describe the scenario where the relative distances for the two directions between component localities is different. If one component locality is unreachable from another, a value of 255 (0xFF) is stored in that table entry. The relative distances from a component locality to itself are normalized to a value of 10, and distance values of 0-9 are reserved and have no meaning.

TABLE 15

CDIT header structure

| Field Header | Byte Length | Byte Offset | Description |
|---|---|---|---|
| Signature | 4 | 0 | 'CDIT'. Signature for the Component Locality Distance Information Table. |
| Length | 4 | 4 | Length, in bytes, of the entire CDIT. The length implies the number of Entry fields at the end of the table |
| Revision | 1 | 8 | 0 |
| Checksum | 1 | 9 | Entire table must sum to zero |
| OEMID | 6 | 10 | OEMID |
| OEM Table ID | 8 | 16 | For the Component Resource Affinity Table, the table ID is the manufacturer model ID |
| OEM Revision | 4 | 24 | OEM revision of Component Resource Affinity Table for supplied OEM Table ID |
| Creator ID | 4 | 28 | Vendor ID of utility that created the table |
| Creator Revision | 4 | 32 | Revision of utility that created the table |
| NumDomains | 4 | 36 | Number of combined CPU/APD architecture proximity domains. This includes possible discrete APD "domains" that are represented for possible Add-In-Boards attached e.g.. via PCI Express. Not all of them may be populated initially at platform definition. This number may be higher than the CPU proximity domains expressed in SRAT due to additional entries for other (PCIe connected) combined CPU/APD architecture components. |
| Entry[0][0] | 1 | 40 | Matrix entry (0, 0), contains a value of 10 |
| ... | | | |
| Entry[0][Number of Domains-1] | 1 | | |
| Entry[1][0] | 1 | | |
| ... | | | |
| Entry[Number of Domains-1][Number of Domains-1] | 1 | | Contains a value of 10. |

Various embodiments of the present invention include a component locality distance information table ('CDIT'). This table provides a mechanism for the combined CPU/APD architecture platform to indicate the relative distance (in terms of transaction latency) between all the combined CPU/APD architecture system localities, which are also referred to herein as combined CPU/APD architecture proximity domains. These embodiments represent improvements to the system locality distance information table (SLIT) as defined in the ACPI 4.0 Specification. The value of each entry[i, j] in the CDIT, where i represents a row of a matrix and j represents a column of a matrix, indicates the relative distances from component locality/proximity domain i to every other component locality j in the system (including itself).

Various embodiments of the present invention include a combined CPU/APD architecture table discovery device. The CRAT is returned when the 'CRAT' method located at the combined CPU/APD architecture device ACPI node is evaluated. The component locality distance information table (CDIT) is returned when the CDIT method located at the combined CPU/APD architecture device ACPI node is evaluated. The presence of the combined CPU/APD architecture discovery device allows for a consistent notification mechanism for hot plug and hot-unplug notifications of combined CPU/APD Architecture components, which in turn requires the reevaluation of the tables and methods. This logical ACPI device is required for a combined CPU/APD architecture system compatible platform.

| Plug and Play ID | Description |
| --- | --- |
| ACPI000F | Combined CPU/APD architecture Topology Reporting Device. This ID is used for combined CPU/APD Architecture capable components. This device provides a control and notification point for all combined CPU/APD Architecture components. |

Figure 5:
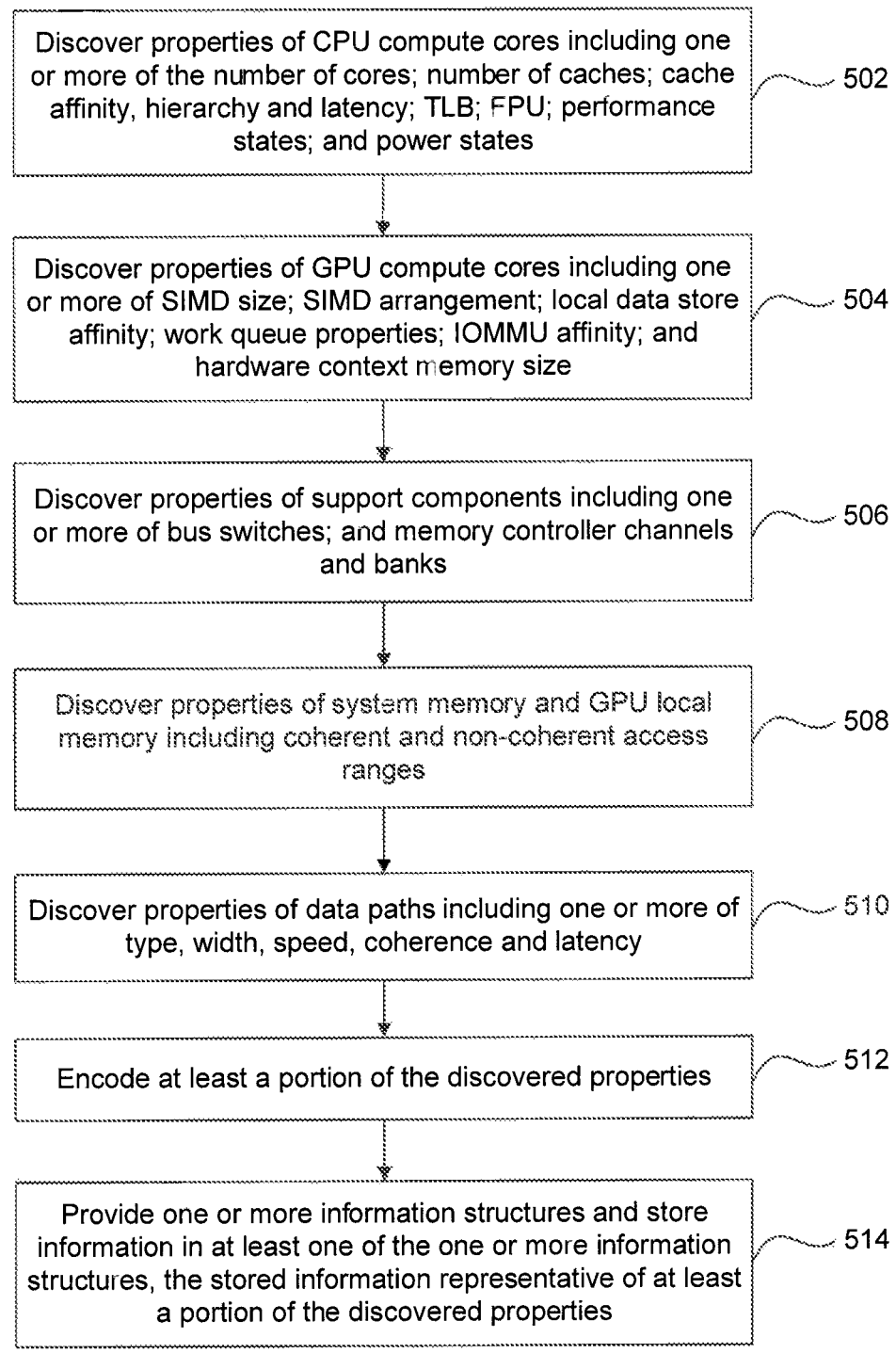
FIG. 5 is a flow diagram of a illustrative process in accordance with an embodiment of the present invention.

FIG. 5 is a flow diagram illustrating a process of discovering and reporting, in accordance with the present invention, the properties and topologies of a combined CPU/APD architecture system. Discovered properties may be relevant to the scheduling and distribution of computational tasks amongst the computational resources of the combined CPU/APD architecture system. Such scheduling and distribution of computational tasks may be handled by the operating system, the application software, or both. The illustrative process includes discovering 502 one or more of the various CPU compute core properties, such as the number of cores, number of cache, cache affinity, hierarchy and latency, TLB, FPU, performance states, power states and so on.

The illustrative process of FIG. 5 further includes discovering 504 properties of APD compute cores including one or more of SIMD size, SIMD arrangement, local data store affinity, work queue properties, IOMMU affinity, and hardware context memory size; discovering 506 properties of support components including one or more of bus switches, and memory controller channels and banks; discovering 508 properties of system memory and APD local memory including but not limited to coherent and non-coherent access ranges; discovering 510 properties of one or more data paths including one or more of type, width, speed, coherence and latency; encoding 512 at least a portion of the discovered properties; and providing 514 one or more information structures and storing information in at least one of the one or more information structures, the stored information representative of at least a portion of the discovered properties.

It is noted that the present invention is not limited to any particular order in which the various properties are discovered. It is further noted that the present invention is not limited to any particular order in which the discovered properties are stored, encoded, reported, or otherwise communicated, transmitted, or made available for use, processing or inspection by any hardware, firmware, operating system or application software. It is still further noted that the present invention is not limited to any particular memory address range or physical type of memory in which the one or more information structures in accordance with the present invention are stored.

The present invention is not limited to any particular means or methods of property discovery. By way of example and not limitation, some properties may be exposed or discovered by executing one or more instructions by at least one of a plurality of computational resources, such instruction execution providing information in one or more registers, or in one or more memory locations. It is still further noted that the present invention is not limited by which particular properties are used by operating system or application software to schedule or distribute computational tasks amongst the computational resources of a combined CPU/APD architecture system.

Figure 6:
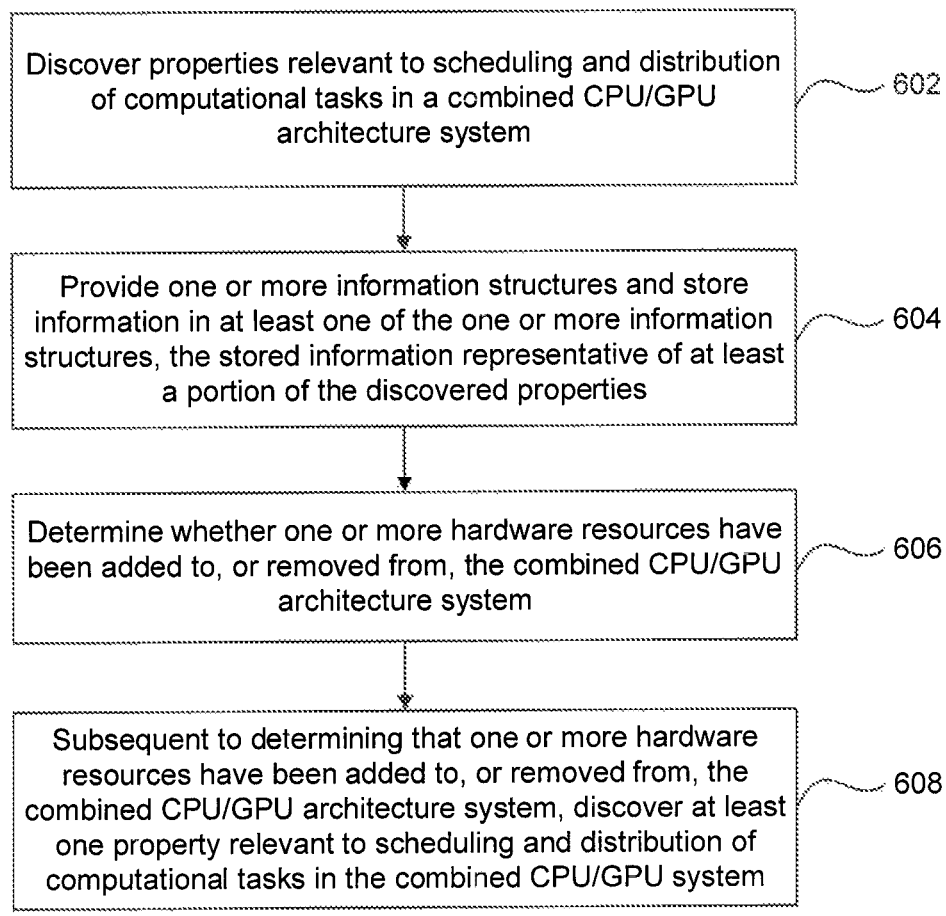
FIG. 6 is a flow diagram of an illustrative process in accordance with an embodiment of the present invention.

FIG. 6 is a flow diagram of an illustrative method of operating a combined CPU/APD architecture system in accordance with the present invention. This illustrative method includes discovering 602 one or more properties relevant to scheduling and distribution of computational tasks in a combined CPU/APD architecture system; providing 604 one or more information structures and storing information in at least one of the one or more information structures, the stored information representative of at least a portion of the discovered properties; determining 606 whether one or more hardware resources have been added to, or removed from, the combined CPU/APD architecture system; and subsequent to determining that one or more hardware resources have been added to, or removed from, the combined CPU/APD architecture system, discovering 608 at least one property relevant to scheduling and distribution of computational tasks in the combined CPU/APD system.

A property is relevant to scheduling and distribution of computational tasks if that property information is used by one or more computational resources of the combined CPU/APD architecture system in the scheduling and/or distribution of computational tasks. In connection with this description of the illustrative embodiment of FIG. 6, a hardware resource is one which provides (i) at least one computational resource that may be assigned to perform one or more computational tasks by the scheduling and distribution logic of operating system software, application software, or both; or (ii) a memory that can be assigned to one or more computational tasks by the scheduling and distribution logic of operating system software, application software, or both.

It is noted that addition of a hardware resource may occur as a result of "hot-plugging" a board or a card into the system. Alternatively, a hardware resource may be physically present in the system but unavailable to be assigned computational tasks until it is "added" through the action of firmware or software making the hardware resource available or visible to the scheduling and distribution logic of operating system software, application software, or both. In this case, "adding" may be referred to as enabling. Similarly, a hardware resource may be removed from the system either by being physically removed therefrom, or by being disabled, or made not visible to the scheduling and distribution logic of operating system software, application software, or both. In this case, "removing" may be referred to as disabling. It is noted that the present invention is not limited to any particular means or method of enabling and disabling a hardware resource. Such hardware resources may be enabled to achieve particular performance levels and disabled to reduce power consumption. Alternatively, a hardware resource may disabled, i.e., made unavailable to receive a task from the scheduling and distribution logic, because that hardware resource has been reserved for another purpose.

In one illustrative embodiment of the present invention, a system includes, but is not limited to, a first computer memory having a predetermined physical storage size and logical arrangement; a first CPU coupled to the first computer memory; the first CPU having a predetermined number of discoverable properties; a first APD coupled to the first computer memory, the first APD having a predetermined number of discoverable properties; and a means for determining at least a portion of the discoverable properties of the first CPU and at least a portion of the discoverable properties of the first APD, encoding the discovered properties and storing the encoded properties in a memory table. It is noted that such a means for determining includes, but is not limited to, software executed by the first CPU, software executed by the first APD, or software executed by both the first CPU and the first APD.

One illustrative method of operating a combined CPU/APD architecture system, in accordance with the present invention includes discovering properties of one or more CPU compute cores; discovering properties of one or more APD compute cores; discovering properties of one or more support components; discovering properties of a system memory; if an APD local memory is present, discovering properties of the APD local memory; discovering properties of data paths including one or more of type, width, speed, coherence and latency; encoding at least a portion of the discovered properties; and providing one or more information structures and storing information in at least one of the one or more information structures, the stored information representative of at least a portion of the discovered properties. Typically the discovered properties are relevant to scheduling computational tasks to one or more of a plurality of computational resources in the combined CPU/APD architecture system. In some embodiments, at least a portion of the discovered properties are discovered by executing one or more instructions on at least one of a plurality of computational resources, such instruction execution providing information in one or more registers of the computational resource executing the one or more instructions, or in one or more memory locations of a memory coupled to the computational resource.

In various alternative embodiments, the method of operating a combined CPU/APD architecture system includes repeating one or more of the discovering operations subsequent to the detection of the addition or removal of at least one hardware resource. In this way, the information relevant to scheduling and distribution of computational tasks may be dynamically updated to reflect the hardware resources that are available at a particular point in time.

Another illustrative method of operating a combined CPU/APD architecture system in accordance with the present invention includes discovering, by operation of the combined CPU/APD architecture system, properties relevant to scheduling and distribution of computational tasks in a combined CPU/APD architecture system; providing, by operation of the combined CPU/APD architecture system, one or more information structures and storing information in at least one of the one or more information structures, the stored information representative of at least a portion of the discovered properties; determining, by operation of the combined CPU/APD architecture system, whether one or more hardware resources have been added to, or removed from, the combined CPU/APD architecture system; and subsequent to determining that one or more hardware resources have been added to, or removed from, the combined CPU/APD architecture system, discovering, by operation of the combined CPU/APD architecture system, at least one property relevant to scheduling and distribution of computational tasks in the combined CPU/APD system.

It is noted that the present invention is not limited to the combination of x86 CPU cores with APDs, but is applicable to various CPU or instruction set architectures combined with APDs.

Conclusion

The exemplary methods and apparatus illustrated and described herein find application in at least the fields of computing devices (including, but not limited to, notebook, desktop, server, handheld, mobile and tablet computers, set top boxes, media servers, televisions and the like), graphics processing, and unified programming environments for heterogeneous computational resources.

It is to be understood that the present invention is not limited to the illustrative embodiments described above, but encompasses any and all embodiments within the scope of the subjoined claims and their equivalents.

What is claimed is:

1. A system, comprising:
a computer memory having a physical storage size and logical arrangement;
a component resource affinity table disposed in the computer memory;
a central processing unit (CPU) coupled to the computer memory; the CPU having a number of discoverable properties, the CPU configured, responsive to executing one or more instructions, to provide at least a portion of the discoverable properties of the CPU, an accelerated processing device, and the memory;
the accelerated processing device (APD) coupled to the computer memory, the APD having a number of discoverable properties, and coupled to an APD local memory; and
a memory management unit coupled to the computer memory and shared by the CPU and the accelerated processing device;
wherein the system is configured to execute an operating system;
wherein the discoverable properties are relevant to scheduling and distribution of computational tasks to the CPU and the APD, and expose coherent and non-coherent access ranges of either the computer memory or the APD local memory that the operating system manages differently.

2. The system of claim 1, further comprising logic for encoding the discovered properties and storing the encoded properties in a memory table.

3. The system of claim 2, wherein the memory table resides in the computer memory.

4. The system of claim 2, further comprising an accelerated processing device local memory, and wherein the properties of the accelerated processing device local memory are stored in the memory table.

5. The system of claim 1, wherein the discoverable properties further include system topological information.

6. A method of operating a combined central processing unit (CPU) and an accelerated processing device (APD) architecture system, comprising:
discovering system topological information;
discovering properties of one or more CPU compute cores;
discovering properties of one or more accelerated processing device compute cores;
discovering properties of one or more support components;
discovering properties of a system memory;
if an accelerated processing device local memory is present, discovering properties of the accelerated processing device local memory;
discovering properties of data paths including one or more of type, width, speed, coherence and latency; and
storing information in at least one of one or more information structures, the one or more information structures including a component resource affinity table, and the stored information representative of at least a portion of the discovered properties.

7. The method of claim 6, wherein the discovered properties are relevant to scheduling computational tasks to one or more of a plurality of computational resources in the combined CPU/APD architecture system.

8. The method of claim 6, further comprising executing one or more instructions by at least one of a plurality of computational resources, such instruction execution providing information in one or more registers of the computational resource executing the one or more instructions, or in one or more memory locations of a memory coupled to the computational resource.

9. The method of claim 6, further comprising repeating one or more of the discovering operations subsequent to the detection of the addition or removal of at least one hardware resource.

10. The method of claim 6, further comprising encoding at least a portion of the discovered properties.

11. A method of operating a combined central processing unit (CPU) and an accelerated processing device (APD) architecture system, comprising:
   discovering, by operation of the combined CPU/APD architecture system, properties relevant to scheduling and distribution of computational tasks in a combined CPU/APD architecture system;
   storing information in at least one of one or more information structures, the one or more information structures including a component resource affinity table, and the stored information representative of at least a portion of the discovered properties;
   dynamically determining, by operation of the combined CPU/APD architecture system, whether one or more hardware resources have been added to the combined CPU/APD architecture system; and
   subsequent to determining that one or more hardware resources have been added to, or removed from, the combined CPU/APD architecture system, discovering, by operation of the combined CPU/APD architecture system, at least one property relevant to scheduling and distribution of computational tasks in the combined CPU/APD system.

12. The method of claim 11, wherein adding a hardware resource comprises hot-plugging the hardware resource into the combined CPU/APD architecture system.

13. The method of claim 11, wherein adding a hardware resource comprises enabling the hardware resource by action of firmware or software.

14. The method of claim 11, wherein removing a hardware resource comprises physically removing the hardware resource from the combined CPU/APD architecture system.

15. The method of claim 11, wherein removing a hardware resource comprises disabling the hardware resource by action of firmware or software.

16. The method of claim 11, wherein the properties include the presence of components of a combined CPU/APD architecture system, interconnections between one or more of the components, and one or more attributes of the components.

17. The method of claim 11, wherein the properties include one or more of the number of cores; number of caches; cache affinity, hierarchy and latency; TLB; FPU; performance states; and power states.

18. The method of claim 11, wherein the properties include one or more of SIMD size; SIMD arrangement; local data store affinity; work queue properties; IOMMU affinity; and hardware context memory size.

19. The method of claim 11, wherein the properties include one or more of bus switches; and memory controller channels and banks.

20. The method of claim 11, wherein the properties includes coherent and non-coherent access ranges of system memory and accelerated processing device local memory.

21. The method of claim 11, wherein properties includes attributes of system memory and accelerated processing device local memory.

22. The method of claim 11, further comprising:
   discovering system topological information.

23. The method of claim 11, further comprising:
   determining, by operation of the combined CPU/APD architecture system, whether one or more hardware resources have been removed from the combined CPU/APD architecture system.

* * * * *